United States Patent Office 2,790,806
Patented Apr. 30, 1957

2,790,806

HETEROCYCLIC COMPOUNDS AND THEIR PREPARATION

William Joseph Middleton, Claymont, Del., assignor to E. I. du Pont de Nemours and Company, Wilmington, Del., a corporation of Delaware No Drawing. Application November 1, 1955, Serial No. 544,360

16 Claims. (Cl. 260—294.9)

This invention is concerned with new heterocyclic compounds, and more particularly with monocyanodiaminohalogenopyridines and their preparation.

It is an object of this invention to provide a new class of useful organic compounds and a process for their preparation. Other objects will become apparent from the following specification and claims.

It has long been known that malononitrile reacts with aqueous halogen acids to produce malonic acid (Henry, Compt. rend., 102, 1394–7 (1886)). This reaction takes place either slowly at room temperature or more rapidly at elevated temperatures.

It has now been discovered that, when a hydrogen halide is brought into contact with malononitrile or the 2-amino-1,1,3-tricyano-1-propene dimer thereof under anhydrous conditions, there is formed a new class of compounds. The 3-cyano-2,4-diamino-6-halogenopyridines of this invention include compounds in which the 6-position of the pyridine is occupied by fluorine, chlorine, bromine, or iodine. The invention includes also the hydrohalide salt forms of these compounds.

In the products of this invention the amino substituents do not include substituted amino groups except to the extent that these amino groups may participate in the salt-forming bond of the hydrohalide salt forms of these pyridines. The term "primary amino" is used to avoid any ambiguity in this connection.

One method for preparing the products of this invention involves preparation of the malononitrile dimer, e. g., as illustrated in Example III, which is then reacted with a hydrogen halide in accordance with the following equation in which X is halogen:

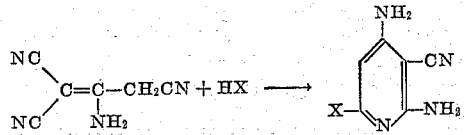

These products are more readily prepared directly from malononitrile without isolating the dimer as an intermediate compound. The same process conditions are suitable for the reaction of HX with malononitrile as with its dimer.

In a preferred embodiment of this invention, a solution of malononitrile in an inert anhydrous solvent is treated at 0°–50° C. with an excess of an anhydrous hydrogen halide. As the gas is absorbed, reaction takes place rapidly and monocyano-2,4-diamino-6-halogenopyridine separates as a precipitate in the form of its hydrohalide salt.

In the following examples, which illustrate specific embodiments of the invention, parts are by weight.

EXAMPLE I

A glass reactor fitted with a stirrer and gas inlet and outlet tubes is dried by heating while dry hydrogen bromide gas is passed through. When the reactor has cooled, a solution of 66 parts of malononitrile in 1760 parts of benzene (dried over sodium metal) is added. The solution is stirred and an excess of dry hydrogen bromide gas is passed over the surface of the solution for one hour. As the gas dissolves, a pale yellow solid precipitates. This precipitate is separated by filtration and washed with benzene to obtain 145 parts of the monohydrobromide salt of 6-bromo-3-cyano-2,4-diaminopyridine. This salt is recrystallized twice from water, the second recrystallization including treatment with decolorizing carbon. In this recrystallization from water part of the hydrogen bromide of the hydrobromide salt is lost.

Anal.—Calcd. for $C_6H_5N_4Br \cdot 0.1HBr$: C, 32.6; H, 2.31; N, 25.3; Br, 39.8. Found: C, 32.3, 32.1; H, 2.70, 2.42; N, 24.2, 24.2; Br, 38.9.

EXAMPLE II

Forty-five parts of the monohydrobromide salt of 6-bromo-3-cyano-2,4-diaminopyridine prepared as in Example I is dissolved in a minimum amount of boiling water and treated with decolorizing carbon. The hot solution is filtered and then made alkaline by adding 176 parts of 10% aqueous sodium hydroxide. A solid starts to precipitate. The mixture is cooled to 2° C. and filtered to obtain 20 parts (72% yield) of 6-bromo-3-cyano-2,4-diaminopyridine. After recrystallization from ethyl alcohol this product melts at 255° C.

Anal.—Calcd. for $C_6H_5N_4Br$: C, 33.82; H, 2.37; N, 26.30; Br, 37.51; M. W., 213. Found: C, 33.92; H, 2.65; N, 26.26; Br, 37.38; M. W., 214.

EXAMPLE III

Part A

Sodiomalononitrile, 1100 parts, is suspended in 13,200 parts of dry benzene and the mixture is refluxed for 24 hours with constant agitation. The mixture is then filtered, and the solid is dried at room temperature. The resulting solid is dissolved in 15,000 parts of ice cold water, and the solution is slowly treated with 830 parts of concentrated hydrochloric acid (d.=1.19) whereupon a tan crystalline solid separates. The solid reaction product is isolated by filtration under reduced pressure, washed with water, and dried at room temperature. Recrystallization from hot water yields 540 parts, corresponding to a yield of 65%, of well-defined needles of 2-amino-1,1,3-tricyano-1-propene, M. P. 170–173° C.

Part B

A solution of 396 parts of 2-amino-1,1,3-tricyano-1-propene in 4440 parts of purified tetrahydrofuran is cooled to 0° C. The solution is stirred at this temperature while an excess of dry hydrogen bromide is passed over it. As the gas is absorbed a solid precipitate starts to form. When no more hydrogen bromide is absorbed, the mixture is filtered to obtain a first crop of 190 parts of the monohydrobromide salt of 6-bromo-3-cyano-2,4-diaminopyridine. A second crop of 130 parts of this salt is obtained when the filtrate from the first crop is drowned in diethyl ether.

This monohydrobromide salt of 6-bromo-3-cyano-2,4-diaminopyridine is converted to the free 6-bromo-3-cyano-2,4-diaminopyridine by the process of Example II and the identity of the product with the product of Example II is confirmed by the identity of their infrared absorption spectra.

EXAMPLE IV

Dry hydrogen chloride gas is bubbled through a solution of 66 parts of 2-amino-1,1,3-tricyano-1-propene in 444 parts of dry tetrahydrofuran. A solid precipitate starts to form immediately. When no more hydrogen chloride is absorbed, the mixture is allowed to stand for 2 days. The precipitate (85 parts of the hydrochloride salt of 6-chloro-3-cyano-2,4-diaminopyridine) is collected by filtration. This product is dissolved in hot water and the solution is rendered alkaline by adding aqueous sodium hydroxide. When the solution has cooled, the precipitate which has formed is separated by filtration and recrystallized from water to obtain 6-chloro-3-cyano-2,4-diaminopyridine melting at 227–232° C.

*Anal.*—Calcd. for $C_6H_5N_4Cl$: C, 42.7; H, 2.96; Cl, 21.1. Found: C, 43.4; H, 2.99; Cl, 22.1.

EXAMPLE V

Dry hydrogen iodide gas is passed over the surface of a vigorously stirred solution of 132 parts of malononitrile in 2640 parts of dry benzene. As the gas dissolves, a pale yellow solid forms rapidly. When no more precipitate is formed, the solid is collected by filtration and 350 parts of the monohydroiodide salt of 3-cyano-2,4-diamino-6-iodopyridine is obtained. This is dissolved in hot water and the hot solution is rendered alkaline by the addition of aqueous sodium hydroxide. Free 3-cyano-2,4-diamino-6-iodopyridine is obtained as a precipitate on cooling. This is recrystallized from hot water using decolorizing carbon to obtain the product in the form of colorless crystals melting (with decomposition) at 238–240° C.

*Anal.*—Calcd. for $C_6H_5N_4I$: C, 27.71; H, 1.94; N, 21.55; I, 48.81. Found: C, 28,57; H, 2.51; N, 20.96; I, 4892.

By substituting anhydrous hydrogen fluoride for the hydrogen chloride of Example IV above 3-cyano-2,4-diamino-6-fluoropyridine is obtained.

The process of the present invention is operable over a wide range of temperatures. The reaction is mildly exothermic and external heating is not necessary. Accordingly, maintaining the temperature in the range from 0°–50° C. represents a preferred operating condition although temperatures both above and below this range may be used. Pressure is not a critical factor and for practical purposes atmospheric pressure is, therefore, preferred.

The use of a solvent which is inert to the reactants represents a preferred procedure since the solvent is a convenient medium for dissipating the heat of the reaction. However, the presence of a solvent is not essential. For example, anhydrous hydrogen bromide may be bubbled into, or passed over, a stirred melt of malononitrile to obtain 6-bromo-3-cyano-2,4-dicyanopyridine hydrobromide. Under these conditions care must be taken to avoid undue spontaneous overheating of the reaction mixture.

When a solvent is used, those solvents which are preferred (primarily because of their relative inertness to the anhydrous hydrogen halides and the products at ordinary temperatures) are the hydrocarbons, such as benzene, pentane, heptane, and the like, and cyclic ethers, such as tetrahydrofuran, dioxane, and the like.

By adjusting the ratio of the hydrogen halide to malononitrile or its dimer in the process of this invention, it is possible to obtain the 3-cyano-2,4-diamino-6-halogenopyridine product in the form of its hydrohalide salt or as the free pyridine. The use of at least two chemical equivalents of hydrogen halide to one of malononitrile (or a corresponding amount of dimer) to obtain the product in the form of the hydrohalide salt represents the preferred procedure because highest yields of product are thereby obtained. With a single chemical equivalent of hydrogen halide for each equivalent of malononitrile, the free 3-cyano-2,4-diamino-6-halogenopyridine is obtained. As shown in the examples the free pyridine may be regenerated from any of the hydrohalide salts by treatment with alkali.

The 3-cyano-2,4-diamino-6-halogenopyridines of this invention are useful as chemical buffers, since aqueous solutions of these compounds resist changes in hydrogen ion concentration. The buffering action of these compounds is provided by the interconversion between the free pyridines and their acid salts. Thus at 92° C. an 0.67% aqueous solution of 6-bromo-3-cyano-2,4-diaminopyridine which has an initial pH of 7.65 is brought to pH 4.01 when 2.56 mole percent of hydrogen chloride is added in the form of 0.1 N HCl (pH 1.50 at 92° C.). Further additions of HCl produce only minor changes in pH. Thus at 17.0 mole percent HCl the pH is 2.98; at 38.3 mole percent HCl the pH is 2.49; and at 91.3 mole percent the pH is 2.01.

Since many different embodiments of the invention may be made without departing from the spirit and scope thereof, it is to be understood that the invention is not limited by the specific illustrations except to the extent defined in the following claims.

What is claimed is:

1. A 3-cyano-2,4-di(primary amino)-6-halogenopyridine.

2. A compound represented by the formula,

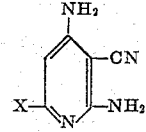

wherein X is a hologen.

3. 3-cyano-2,4-diamino-6-fluoropyridine.
4. 3-cyano-2,4-diamino-6-chloropyridine.
5. 3-cyano-2,4-diamino-6-bromopyridine.
6. 3-cyano-2,4-diamino-6-iodopyridine.
7. The process for preparing a monocyano-2,4-diamino-6-halogenopyridine which comprises reacting a nitrile selected from the group consisting of malononitrile and the 2-amino-1,1,3-tricyano-1-propene dimer of malononitrile with a hydrogen halide under anhydrous conditions.
8. A process as defined in claim 7 wherein the reaction is conducted in an inert solvent.
9. A process as defined in claim 7 wherein the temperature is maintained at 0°–50° C.
10. A process as defined in claim 7 wherein an excess of hydrogen halide is used and the product is recovered in the form of a hydrohalide salt.
11. A process as defined in claim 7 wherein chemically equivalent amounts of the nitrile and hydrogen halide are used and the product is recovered as the free monocyano-2,4-diamino-6-halogenopyridine.
12. The process for preparing a monocyano-2,4-diamino-6-halogenopyridine which comprises treating a solution of malononitrile in an inert anhydrous solvent with anhydrous hydrogen halide and isolating the product formed.
13. A process as defined in claim 12 wherein the temperature is maintained at 0°–50° C.
14. A process as defined in claim 12 wherein an excess of hydrogen halide is used and the product is recovered in the form of a hydrohalide salt.
15. A process as defined in claim 12 wherein chemically equivalent amounts of malononitrile and hydrogen halide are used and the product is recovered as the free monocyano-2,4-diamino-6-halogenopyridine.
16. The process for preparing a monocyano-2,4-diamino-6-halogenopyridine which comprises treating a solution of 2-amino-1,1,3-tricyano-1-propene in an inert anhydrous solvent with anhydrous hydrogen halide at a temperature of 0°–50° C. and isolating the product formed.

No references cited.